United States Patent Office 2,801,977
Patented Aug. 6, 1957

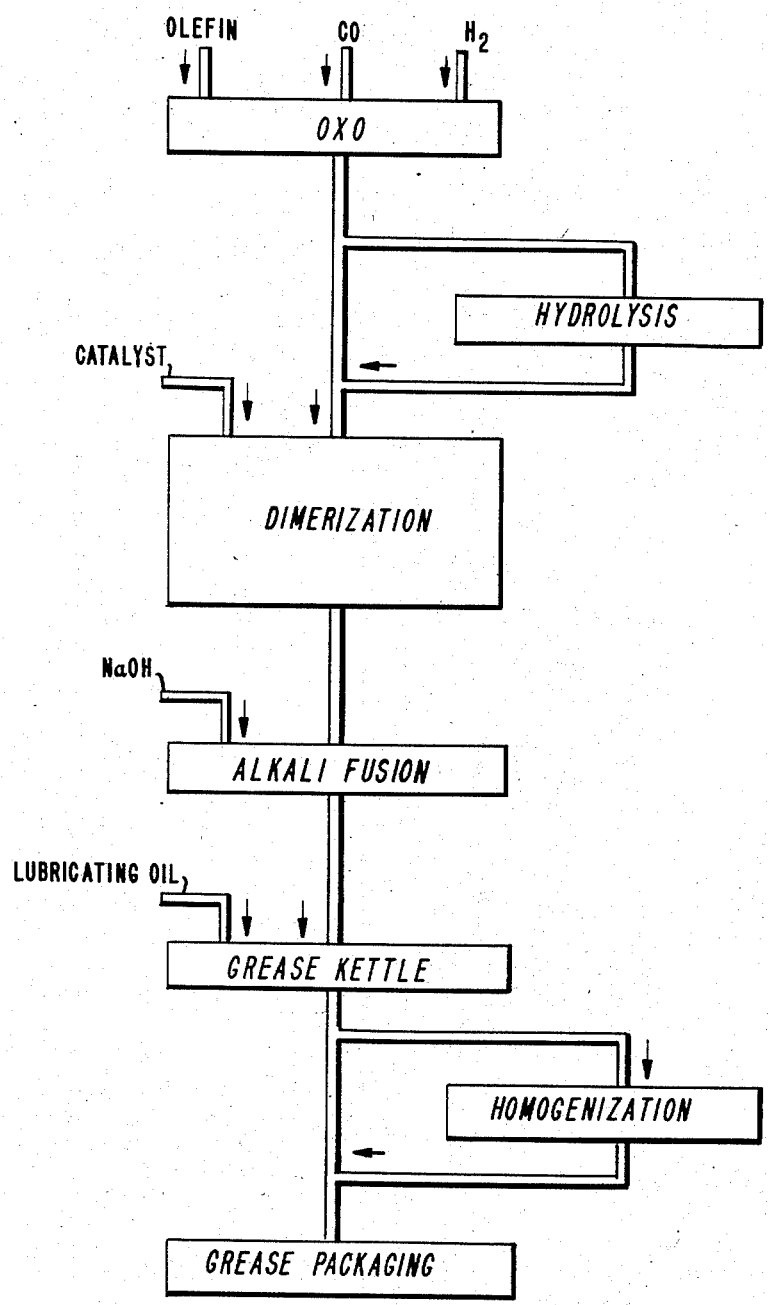

2,801,977

PREPARATION OF GREASE THICKENERS FROM OXO REACTION PRODUCTS

Arnold J. Morway, Clark, Jeffrey H. Bartlett, Westfield, and John C. Munday, Cranford, N. J., assignors to Esso Research and Engineering Company, a corporation of Delaware Application November 27, 1953, Serial No. 394,709

13 Claims. (Cl. 252—42)

This invention relates to novel lubricating grease compositions and to the process for their preparation. Particularly, the invention relates to lubricating grease compositions which utilize the Oxo or primary stage products from the Oxo reaction as thickening agents. More particularly, the invention relates to lubricating grease compositions which comprise a lubricating oil base stock thickened to a grease consistency with the metal soaps of a mixture of acids derived from the products of the reaction of a monoolefin with carbon monoxide and hydrogen in the Oxo stage of the Oxo process.

It has been known to the art that oxygenated organic compounds may be made by reacting together carbon monoxide, hydrogen, and a monoolefinic hydrocarbon to form an intermediate product which may be subsequently reduced to an alcohol having one carbon atom more than the starting hydrocarbon. This reaction is carried out in the presence of a cobalt-containing catalyst, or an equivalent catalyst, in a two-stage operation, the product formed in the first stage containing large amounts of aldehydes having one more carbon atom than the starting olefin. Smaller amounts of alcohols, esters, acetals, etc. are also present. In the second stage the product of the first stage is hydrogenated or reduced to form the corresponding alcohols.

These reactions may be simply represented for a monoolefinic feed as follows, it being understood that other reactions may take place to a minor extent.

First stage:

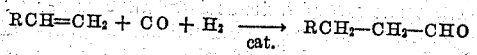

or

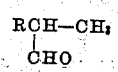

Second stage:

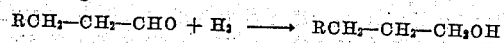

or

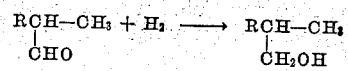

It is evident from the above equations that a primary alcohol containing one more carbon atom than the starting monoolefin will result and that the position in the molecule of the added group will depend on the position of the double bond in the original olefin, or the position to which the double bond may shift by isomerization under the reaction conditions used.

The olefin feed for the above reactions may be olefins such as hexenes, heptenes, octenes, nonenes, decenes, dodecenes, tetradecene and higher olefins, olefin polymers, such as diisobutylene, triisobutylene, polypropylenes, and olefinic fractions from the hydrocarbon synthesis process, from thermal or catalytic cracking of petroleum oils, petrolatum, wax, etc., and from other sources.

Of particular interest are the polymers and copolymers of $C_3$ and $C_4$ monoolefins. These monoolefins are readily available in petroleum refinery streams, and processes for their conversion to liquid copolymers have been described by the art. One such process, known as U. O. P. polymerization, consists of passing the olefin-containing stream in liquid phase in contact with an acid catalyst comprising phosphoric acid impregnated on kieselguhr. Other acidic catalysts, such as phosphoric acid or copper phosphate impregnated on silica gel, sulfuric acid, Friedel-Crafts catalysts, activated clays, silica-alumina, copper pyrophosphate, etc., may be used. Suitable conditions when employing phosphoric acid catalyst of the U. O. P. type are temperatures of 300° to 500° F., pressures of from 250 to 5,000 p. s. i. and feed stocks comprising refinery streams containing propylene and mixed butylenes. Suitable feed stocks, for example, may contain from 15 to 60 mol. percent propylene, from 0.5 to 15 mol. percent butylenes, and from 0.1 to 10 mol. percent isobutylene, the remaining being saturated hydrocarbons. Other suitable feed stocks are the dimer and trimer of isobutylene. Propylene polymers are especially useful.

The carbon monoxide and hydrogen may be manufactured by conventional methods from many materials, such as coke, coal, lignite, or hydrocarbon gases, such as natural gas or methane. The solid materials may be converted by known methods into carbon monoxide and hydrogen by treatment with steam and/or carbon dioxide. The ratio of carbon monoxide to hydrogen may be varied by varying the amount of steam used to react with the solid material so that a part of the carbon monoxide may react with the steam to form carbon dioxide and hydrogen, thus increasing the molar ratio of hydrogen to carbon monoxide. The carbon dioxide may be removed by scrubbing the gaseous mixture with aqueous ethanolamine or other basic substance. The hydrocarbon gases may be converted to hydrogen and carbon monoxide in a number of ways, such as treatment with oxygen, carbon dioxide, or steam, or a combination of steam and carbon dioxide, catalytically, in accordance with known procedures.

In the first stage of the reaction, or the aldehyde synthesis stage, hereinafter referred to as the Oxo stage, the ratio of hydrogen to carbon monoxide employed may vary appreciably. Ratios of 0.5 volume to 2.0 volumes of hydrogen per volume of carbon monoxide may be employed. The preferred ratios comprise about 1.0 volume of hydrogen per volume of carbon monoxide. The quantities of olefins employed per volume of carbon monoxide and hydrogen likewise may vary considerably, as may the composition of the olefin feed stream. The olefin feed, as mentioned above, may comprise pure olefins or may comprise olefins containing paraffinic and other hydrocarbons. In general, it is preferred that the olefin feed stock comprise olefins having from 6 to 24 carbon atoms per molecule. Particularly desirable olefins comprise those having from about 8 to 18 carbon atoms per molecule.

The Oxo stage is generally carried out at pressures ranging from about 100 to 300 atmospheres and at a temperature in the range of about 200° to about 400° F. The quantity of hydrogen plus carbon monoxide with respect to olefin utilized may vary considerably, as for example, from 1000 to 45,000 standard condition cubic feet of carbon monoxide and hydrogen per barrel of liquid olefin feed. In general, however, approximately 2500 to 15,000 cubic feet of carbon monoxide-hydrogen gas per barrel of olefin feed is used.

It is with the products of the first, or Oxo, stage of the Oxo process described above that the instant invention is concerned. It has been found, and forms the object of this invention, that excellent grease-forming soaps can be prepared from the mixture of products resulting from this first stage of the Oxo process.

As was pointed out above, the products of the first stage of the Oxo process contain aldehydes, alcohols, acetals, esters, etc. The product obtained by the oxonation of a $C_7$ olefin copolymer of propylene and butylene has the following approximate composition:

| | Percent |
|---|---|
| Unreacted olefin | 20 |
| Aldehydes | 35 |
| Esters | 10 |
| Alcohols | 10 |
| Acetals | 15 |
| Higher alcohols, glycols ethers, etc. | 10 |

According to the process of the instant invention, this mixture of products is substantially completely converted to grease forming soaps by the following series of reactions.

STEP 1.—HYDROLYSIS

The mixture of Oxo stage products are first treated with an acid solution, such as aqueous acetic acid, aqueous hydrochloric acid, aqueous sulfuric acid, toluene sulfonic acid, or the like, at a temperature of about 80° to 300° F. This hydrolysis step converts the acetal component of the mixture to aldehydes and alcohols in accordance with the following equation:

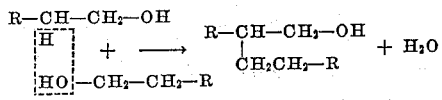

The hydrolysis is preferably carried out in an inert atmosphere, although not absolute necessary, and ordinarily takes from about 10 minutes to 20 hours, depending, of course, on the type and amount of the acetals present and the temperature.

STEP 2.—DIMERIZATION REACTIONS (a) *Aldol condensation of aldehydes.*—At a temperature of about 30° to 200° F. in the presence of an alkaline catalyst, such as sodium alcoholate, sodium carbonate, sodium hydroxide, and the like, aldehydes possessing a methylene group adjacent to the carbonyl group readily condense to an aldol which is a beta-hydroxy aldehyde. This material is readily dehydrated to the unsaturated aldehyde having twice as many carbon atoms as the starting material. The reaction takes place in accordance with the following:

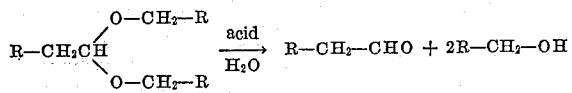

It is preferred that the molecular ratio of catalyst to aldehyde in this reaction be about 1 to 20, more preferably from 1 to about 10. The dehydration step is easily accomplished by heating the mixture alone, or in the presence of a trace of mineral acid.

(b) *Guerbetization of alcohols.*—When primary or secondary alcohols are contacted with an alkaline catalyst such as sodium alcoholate, sodium borate, sodium alkyl borate, sodium hydroxide, metallic sodium, and the like, the methylene group adjacent to the carbinol (hydroxylated carbon) group enters into a condensation reaction with another molecule in a reaction called the Guerbet reaction. This reaction takes place under the following conditions:

| | |
|---|---|
| Alcohol/caustic mol ratio | 1:1 to 20:1 |
| Temperature | 390° to 500° F. |
| Time | 5 to 10 hours |

When relatively low concentrations of catalyst are used, e. g., 10 to 20 mols of alcohol per mol of sodium alcoholate, water is eliminated in accordance with the following equation:

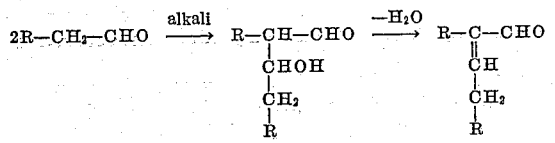

The yield of the alcohol is increased by use of minor amounts, from 1 to 5 grams per mol of alcohol, of a dehydrogenation catalyst, such as copper, zinc, nickel, ferric salts, and the like. Catalysis is not essential, however.

By Step 1 and Step 2 of the inventive process the acetals, alcohols and aldehydes present in the mixture of products of the Oxo stage are substantially converted into higher alcohols and aldehydes. There is then present in the reaction mixture these components plus a minor amount of esters. In the third step of the process, the alkaline fusion reaction, these materials are converted into the metallic soaps of the corresponding acids.

STEP 3.—ALKALI FUSION

The alkali fusion step is accomplished by adding to the mixture of products from 1 to 2 mols of an alkali metal hydroxide such as sodium hydroxide, or potassium hydroxide, per mol of product and raising the temperature to one within the range of from 500° to 650° F. and maintaining the temperature until hydrogen evolution is substantially complete, ordinarily from ½ to 5 hours. During the fusion step the following conversions take place:

(1) The unsaturated aldehydes are converted to metallic soaps of the corresponding acids, e. g.

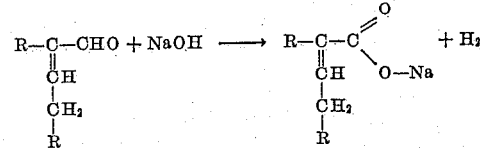

(2) The alcohols are converted to the metallic soaps of the corresponding acids, e. g.

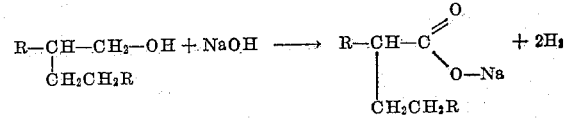

(3) The esters are split, the acid constituents being converted to the metallic soaps, and the alcohol constituents being fused to soaps of the corresponding acids, e. g.

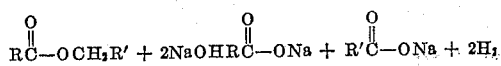

After the fusion reaction is completed, a lubricating oil may be added to the product in proportions so as to give a composition containing from 5 to 40 percent soap, by weight, based on the weight of the total composition.

The inventive process is diagrammatically presented by the accompanying drawing which represents a flow plan of the process.

If desired, all of the reactions can be carried out in sequence, without costly intermediate purification. For example, the acetals may be hydrolyzed by warming with aqueous acetic acid solution; alkali may then be added to catalyze aldolization; the batch dehydrated and held at temperatures conducive to dimerization of the alcohols until complete; additional alkali then added and the temperature raised to fusion temperature; the lubricating oil added and the batch cooled to obtain the finished grease composition. On the other hand, the process has considerable flexibility. For example, it is possible to by-pass the dimerization of the alcohol or aldehyde to a considerable extent by adding all the alkali at the start and proceeding directly at fusion temperature. In this case, however, the product contains a greater percentage of lower molecular weight acids having the same number of carbons as the original alcohol and aldehyde.

It may also be desirable to incorporate in the greases of this invention soaps of conventional grease-making acids, such as those derived from animal and vegetable fats. The conventional soaps may be present in amounts varying from 5% to 30%, preferably from about 5% to 20%, based on the weight of the total composition. Other thickeners such as carbon black, silica gel, bentonites, N-acyl p-aminophenols, etc. can be used similarly. Where high dropping point greases are desired, salts of low molecular weight acids such as acetic, furoic, acrylic, formic, etc. can be added to form complex type greases.

Where as in the description above, sodium soaps are mentioned specifically, it will be obvious that the acids produced by this process can be converted to soaps of other metals, such as lithium, calcium, barium, strontium, aluminum, magnesium, and the like.

The lubricating oil serving as the menstruum for the greases of this invention may be any known lubricating composition, either naturally occurring or synthetic. If a mineral oil is desired, any conventionally refined base stock may be used, whether aromatic or paraffinic in nature. Generally the oil will have a viscosity within the range of from about 35 to 200 SUS at 210° F. Any of the well-known synthetic lubricants may be used, such as dibasic acid esters, e. g., sebacate, adiphate, azelate esters, complex esters made from alcohols, glycols and dibasic acids, polyalkylene ethers and ether esters, lubricating oils made by polymerizing olefins, and condensates of olefins and aromatics, polymerized silicones, condensates of alcohols and alkylene oxides, and the like.

In one embodiment of the invention the products of the Oxo stage are stripped of light hydrocarbons and charged to a grease kettle along with the lubricating oil. An acid catalyst such as an aqueous solution of acetic acid is added to the mixture and the temperature raised to about 80° to 300° F. for from 10 minutes to 20 hours. This step accomplishes the hydrolysis of the acetals present in the Oxo stage product to the corresponding alcohols and aldehydes. Calculated amounts of sodium hydroxide are then added to the reaction mixture and the temperature is maintained between about 30° to 200° F. for from 1 to 10 hours. During this time aldolization of the aldehydes takes place. The temperature is then gradually raised in order to dehydrate the aldols and drive off water by heating to about 210° to about 350° F. for from 1 to 6 hours.

The material is then held at a temperature of within the range of from about 390° to 500° F. for a sufficient time to complete the dimerization of the alcohols. After this dimerization reaction is completed, usually in from 5 to 10 hours, additional alkali is added and the temperature is raised to fusion temperature, i. e., from about 500° to about 650° F., and maintained at that temperature until alkali fusion has been completed. The product is then allowed to cool to a temperature below the transition temperature of the soap, i. e., to about 250° to 200° F. The grease composition may then be milled or homogenized and packaged.

To illustrate the invention more in detail, the following examples are given.

PREPARATION OF OXO STAGE PRODUCT

A $C_7$ copolymer of propylene and butylene obtained by the U. O. P. polymerization of the monomers was placed in a stainless steel bomb. A catalytic amount of cobalt oleate was added and the bomb was pressurized to about 200 atmospheres pressure with an equimolar mixture of carbon monoxide and hydrogen. The temperature of the bomb was then raised to about 350° F. The pressure was released and the product obtained was stripped of light hydrocarbons at a pot temperature of 235° F. at 100 mm. of mercury.

The stripped product had the following approximate analysis:

| | Percent |
|---|---|
| $C_8$ aldehyde | 45.0 |
| $C_8$ alcohol | 15.0 |
| Acetals | 20.0 |
| Esters, higher alcohols, etc | 20.0 |

*Example 1*

FORMULATION

| Components: | Weight percent |
|---|---|
| Hydrogenated fish oil acids | 10.00 |
| Oxo stage product (stripped) | 20.00 |
| Acetic acid | 4.00 |
| Phenyl alpha-naphthylamine | 1.00 |
| Sodium hydroxide (40% aqueous sol.) | 6.50 |
| Lubricating oil (vis. 210° F./55 SUS) | 58.50 |

PROCEDURE

The mineral oil, the fish oil acids, the Oxo stage product, and the acetic acid were charged to a fire heated grease kettle equipped with means for good agitation. This mixture was heated to about 85° F. and was stirred for about four hours under a nitrogen blanket. The mixture was then allowed to stand quiescent for about 16 hours. The sodium hydroxide solution was then added and heat was applied with stirring. The temperature was raised gradually over a period of about 2 hours to about 250° F. During this time the aldehydes were converted to the beta-hydroxy aldehydes and were dehydrated to the unsaturated branched chain aldehydes. The heating was continued until about 400° F. was reached and this temperature level was maintained for about 6 hours. During this time the alcohols were dimerized or Guerbetized to high molecular weight branched chain alcohols. The temperature was then raised to about 550° F. to 590° F. and maintained at that temperature for about 45 minutes. At this temperature the unsaturated aldehydes were converted to the sodium soaps of the corresponding acids, and the alcohols and esters were fused and converted to the corresponding sodium soaps. Heating was then discontinued and the mixture was allowed to cool with stirring to about 250° F. The phenyl alpha-naphthylamine was then added, and cooling was continued to about 200° F. at which temperature the mixture was homogenized.

The resulting grease composition was of excellent appearance and had a uniform short fiber. Its free alkalinity was 1.5 as NaOH. Standard grease inspections gave the following results:

| | |
|---|---|
| ASTM penetration (77° F., mm./10): | |
|   Unworked | 190 |
|   Worked, 60 strokes—ASTM grease worker, fine hole plate | 210 |
|   Worked, 100,000 strokes | 220 |
| Dropping point, ° F | 500+ |
| Water washing test, 210° F., percent loss | None |
| Norma-Hoffman oxidation test (hours to 5 p. s. i. drop in oxygen pressure) | 245 |
| Spindle test, 10,000 R. P. M. at 250° F., lubrication life, hrs | 1250 |

*Example 2*

FORMULATION

| Components: | Weight percent |
|---|---|
| Hydrogenated fish oil acids | 5.00 |
| Oxo stage product | 10.00 |
| Acetic acid | 2.00 |
| Phenyl alpha-naphthylamine | 0.50 |
| Sodium hydroxide | 3.25 |
| Mineral oil, vis./210° F. 55 SUS | 29.25 |
| Mineral oil, vis./210° F. 52 SUS, V. I. of 103 | 50.00 |

PREPARATION

This grease composition was prepared in a manner similar to that of Example 1 above. The finished composition had an excellent smooth uniform appearance and was of short fiber. Standard ASTM inspections on this product gave the following results:

ASTM penetration (77° F., mm./10):
    Unworked _____ 248
    Worked, 60 strokes_____ 266
    Worked, 100,000 strokes_____ 275
Dropping point, ° F_____ 462
Water washing test, 210° F., percent loss_____ 5
Norma-Hoffman oxidation test (hours to 5 p. s. i. drop in oxygen pressure)_____ 212
Spindle test, 10,000 R. P. M. at 250° F., lubrication life, hrs_____ 945

The data obtained on the grease compositions prepared as described above show that an excellent stable composition may be obtained from the Oxo stage product when treated in accordance with the instant invention. The greases exhibit high dropping points and excellent structural stability. The long lubrication life in the high speed anti-friction bearing spindle test coupled with the oxidation stability of the products indicate excellent performance in the severe uses for industrial application.

To summarize briefly, the instant invention relates to novel lubricating grease compositions and to a process for their manufacture. The invention relates particularly to lubricating grease compositions which comprise a lubricating oil thickened to a grease consistency by a mixture of high molecular weight acids prepared from the product obtained by subjecting an olefin to the action of carbon monoxide and hydrogen in the Oxo process. Specifically the invention relates to a lubricating grease composition which is prepared by a process comprising the steps of admixing with a lubricating oil the desired amount of the Oxo stage products and sufficient acidic material to result in an acidic mixture, maintaining intimate contacting until acetals present in the Oxo stage product are hydrolyzed to the corresponding aldehydes and alcohols, ordinarily from 10 minutes to 20 hours at a temperature of from about 80° to 300° F., adding a catalytic amount of an alkali to the mixture, maintaining the temperature at about 30° to 200° F. for a sufficient period of time to aldolize the aldehyde materials to the corresponding beta-hydroxy aldehyde products, ordinarily from about 1 to about 10 hours, raising the temperature to about 210° F. to 350° F. to dehydrate said beta-hydroxy product to the unsaturated aldehydes, maintaining that temperature until the evolution of water has substantially ceased, further raising the temperature to about 390° F. to 500° F. for from about 5 to about 10 hours to dimerize the alcoholic material present, adding a metallic hydroxide to the mixture, raising the temperature to about 500° F. to about 650° F. to fuse the alcohols, the unsaturated aldehydes, and the esters and to form the metallic soaps of the resulting acidic materials, ordinarily from about ½ to 5 hours, and cooling and homogenizing the resulting solution to obtain the finished grease composition.

If desired additive materials, such as oxidation inhibitors, coloring agents, and the like may be added to the composition prior to homogenizing. The resulting compositions exhibit excellent structural stability, high dropping points, and high oxidation resistance.

What is claimed is:
1. A process for the preparation of new and useful grease forming materials which comprises the steps of subjecting an olefin to the action of carbon monoxide and hydrogen in the presence of a carbonylation catalyst at pressures within the range of from 100 to 300 atmospheres and at temperatures within the range of from 200° F. to 400° F. to obtain a mixture of products, acidifying said mixture of products with an aqueous acidic material and heating to a temperature of about 80° F. to about 300° F. for from 10 minutes to about 20 hours, adding to the heated mixture of products an alkali in amounts sufficient to insure a mol ratio of alkali to said mixture of products of from about 1:10 to about 1:20 and maintaining the temperature at about 30° F. to about 200° F. for from about 1 to about 10 hours, raising the temperature to about 210° F. to about 350° F. and maintaining it within that range until the evolution of water has substantially ceased, again raising the temperature to about 390° F. to about 500° F. for from about 5 to about 10 hours, adding a metallic hydroxide to the heated mixture in amounts sufficient to insure a mol ratio of said hydroxide to said mixture of products of from about 1:1 to about 2:1, and raising the temperature to about 500° F. to about 650° F. for about ½ hour to about 5 hours to obtain the desired final product.

2. A process according to claim 1 wherein said olefin is a $C_7$ polymer of butylene and propylene.

3. A process according to claim 1 wherein said aqueous acidic material is aqueous acetic acid.

4. A process according to claim 1 wherein said alkali is sodium hydroxide.

5. A process according to claim 1 wherein said metallic hydroxide is sodium hydroxide.

6. A process for the preparation of new and useful lubricating grease compositions which comprises thickening to a grease consistency a lubricating oil base stock with from 5% to 40% by weight, based on the weight of the total composition, of a product obtained by subjecting an olefin to the action of carbon monoxide and hydrogen in the presence of a carbonylation catalyst at pressures within the range of from 100 to 300 atmospheres and at temperatures within the range of from 200° F. to 400° F. to obtain a mixture of products, acidifying said mixture of products with an aqueous acidic material and heating to a temperature of about 80° F. to about 300° F. for from 10 minutes to about 20 hours, adding to the heated mixture of products an alkali in amounts sufficient to insure a mol ratio of alkali to said mixture of products of from about 1:10 to about 1:20 and maintaining the temperature at about 30° F. to about 200° F. for from about 1 to about 10 hours, raising the temperature to about 210° F. to about 350° F. and maintaining it within that range until the evolution of water has substantially ceased, again raising the temperature to about 390° F. to about 500° F. for from about 5 to about 10 hours, adding a metallic hydroxide to the heated mixture in amounts sufficient to insure a mol ratio of said hydroxide to said mixture of products of from about 1:1 to 2:1, raising the temperature to about 500° F. to about 650° F. for about ½ to about 5 hours, cooling the mixture to about 200° F. to 250° F. and homogenizing the cooled mixture to obtain a finished grease composition.

7. A process according to claim 6 wherein said olefin is a $C_7$ polymer of butylene and propylene.

8. A process according to claim 6 wherein said acidic material is acetic acid.

9. A process according to claim 6 wherein said alkali is sodium hydroxide.

10. A process according to claim 6 wherein said olefin is a $C_7$ polymer of butylene and propylene, wherein said acidic material is acetic acid, and wherein said alkali and said metallic hydroxide is sodium hydroxide.

11. A process for the preparation of new and useful lubricating grease compositions which comprises thickening a lubricating oil base stock to a grease consistency with a mixture of about 5% to about 20% by weight of the sodium soap of hydrogenated fish oil acids and about 5% to 40% by weight of a product obtained by subjecting an olefin to the action of carbon monoxide and hydrogen in the presence of a carbonylation catalyst at pressures within the range of from 100 to 300 atmospheres and at temperatures within the range of from 200° F. to 400° F. to obtain a mixture of products, acidifying said mixture of products with an aqueous acidic material and heating to a temperature of about 80° F. to about 300° F. for from 10 minutes to about 20 hours, adding to the heated mixture of products an alkali in amounts sufficient to insure a mol ratio of alkali to said mixture of products of from about 1:10 to about 1:20 and maintaining the temperature at about 30° F. to about 200° F. for from about 1 to about 10 hours, raising the temperature to about 210° F. to about 350° F. and maintaining it within that range until the evolution of water has substantially ceased, again raising the temperature to about 390° F. to about 500° F. for from about 5 to about 10 hours, adding a metallic hydroxide to the heated mixture in amounts sufficient to insure a mol ratio of said hydroxide to said mixture of products of from about 1:1 to 2:1, raising the temperature to about 500° F. to about 650° F. for about ½ to about 5 hours, cooling the mixture to about 200° F. to 250° F. and homogenizing the cooled mixture to obtain a finished grease composition.

12. A process for the preparation of new and useful grease forming materials which comprises the steps of subjecting an olefin to the action of carbon monoxide and hydrogen in the presence of a carbonylation catalyst at pressures within the range of from 100 to 300 atmospheres and at temperatures within the range of from 200° F. to 400° F. to obtain a mixture of products, acidifying said mixture of products with an aqueous acidic material and heating to a temperature of about 80° F. to about 300° F. for from 10 minutes to about 20 hours, adding to the heated mixture of products an alkali in amounts sufficient to insure a mol ratio of alkali to said mixture of products of from about 1:1 to about 1:20 and maintaining the temperature at about 30° F. to about 200° F. for from about 1 to about 10 hours, raising the temperature to about 210° F. to about 350° F. and maintaining it within that range until the evolution of water has substantially ceased, again raising the temperature to about 390° F. to about 500° F. for from about 5 to about 10 hours, adding a metallic hydroxide to the heated mixture in amounts sufficient to insure a mol ratio of said hydroxide to said mixture of products of from about 1:1 to about 2:1, and raising the temperature to about 500° F. to about 650° F. for about ½ hour to about 5 hours to obtain the desired final product.

13. A process for the preparation of new and useful grease forming materials which comprises the steps of subjecting an olefin to the action of carbon monoxide and hydrogen in the presence of a carbonylation catalyst at pressures within the range of from 100 to 300 atmospheres and at temperatures within the range of from 200° F. to 400° F. to obtain a mixture of products, acidifying said mixture of products with an aqueous acidic material and heating to a temperature of about 80° F. to about 300° F. for from 10 minutes to about 20 hours, adding to the heated mixture a catalytic amount of an alkali and maintaining the temperature at about 30° F. to about 200° F. for from about 1 to about 10 hours, raising the temperature to about 210° F. to about 350° F. and maintaining it within that range until the evolution of water has substantially ceased, again raising the temperature to about 390° F. to about 500° F. for from about 5 to about 10 hours, adding a metallic hydroxide to the heated mixture in amounts sufficient to insure a mol ratio of said hydroxide to said mixture of products of from about 1:1 to about 2:1, and raising the temperature to about 500° F. to about 650° F. for about ½ hour to about 5 hours to obtain the desired final product.

References Cited in the file of this patent

UNITED STATES PATENTS

| 2,648,694 | Mason | Aug. 11, 1953 |
| 2,670,385 | Rosenthal et al. | Feb. 23, 1954 |

OTHER REFERENCES

I. G. Farbenindustrie Aktiengesellschaft, Oxo Process, Translated by C. A. Meyer and Co., New York city, 1948, pp. 57–59.

Bur. of Mines Report of Investigations 4220, June 1948, pp. 9, 10, and 26.